April 25, 1950  P. WEATHERS ET AL  2,505,164
APPARATUS FOR AND METHOD OF TESTING MUSICAL REEDS
Filed Nov. 30, 1946
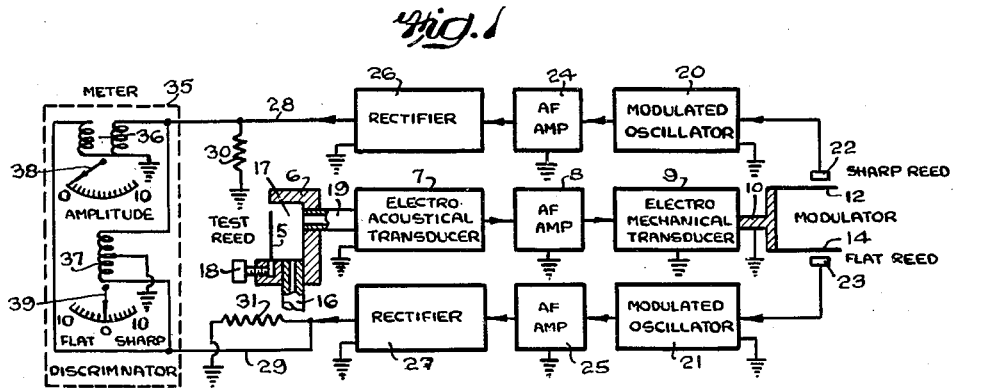
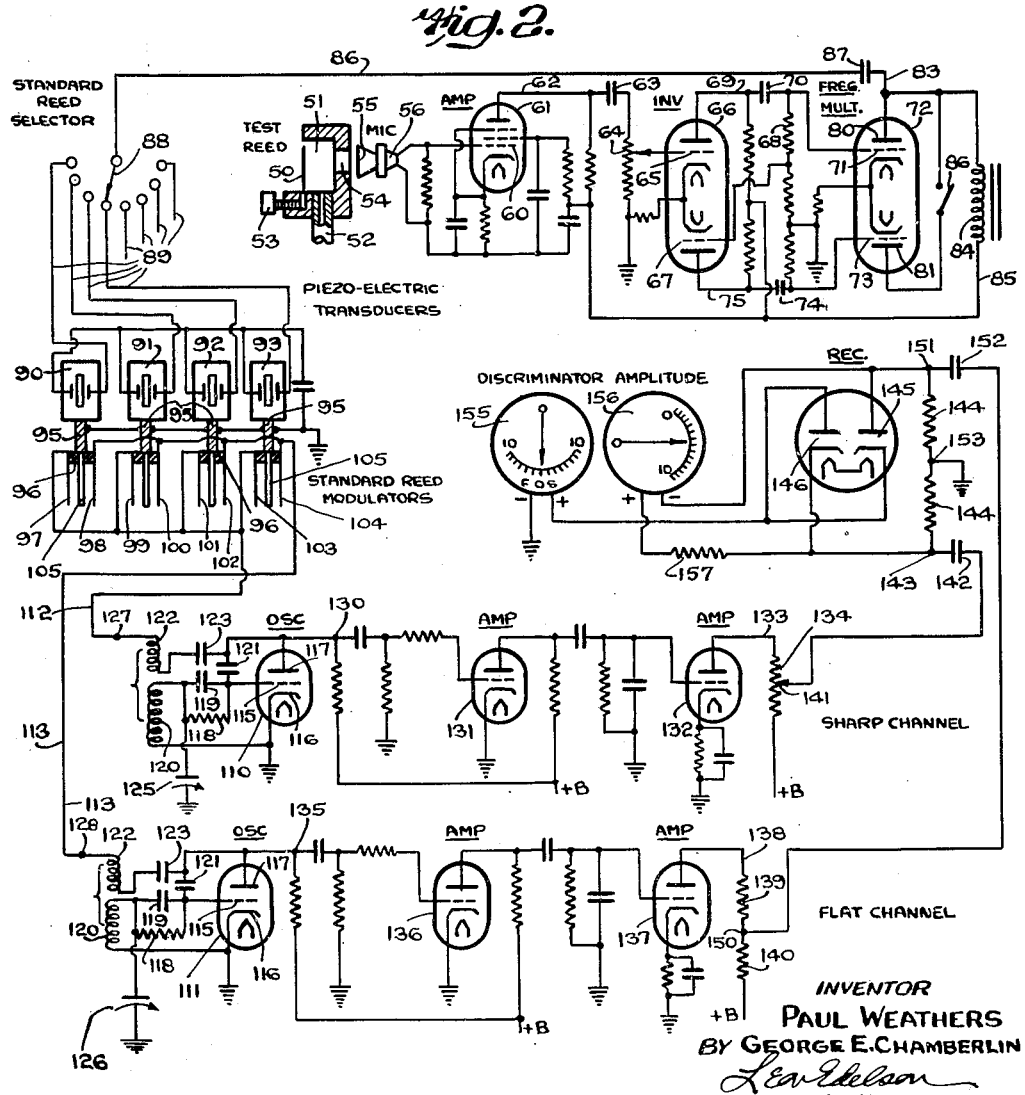
INVENTOR
PAUL WEATHERS
BY GEORGE E. CHAMBERLIN
Leo Edelson
ATTORNEY

UNITED STATES PATENT OFFICE 2,505,164

APPARATUS FOR AND METHOD OF TESTING MUSICAL REEDS

Paul Weathers, Haddon Heights, N. J., and George E. Chamberlin, Penn Valley, Pa., assignors, by direct and mesne assignments, to Harmonic Reed Corporation, Philadelphia, Pa., a corporation of Pennsylvania Application November 30, 1946, Serial No. 713,248

9 Claims. (Cl. 84—454)

The present invention relates to an improved method and means for testing musical reeds for wind instruments and the like, and has for its primary object to provide an electronic test method and means for determining the pitch or operational frequency response of a musical reed with respect to a predetermined desired standard, with greater accuracy and speed in production.

Quantity production of reeds for wind instruments and the like requires that variable factors in manufacture and test be reduced to a minimum. The controlling factors of pitch in a reed are stiffness and mass, both of which must be maintained to a standard with a high degree of accuracy.

In use, musical reeds are vibrated either mechanically or by air currents (wind-blown) to produce different tones. In producing such tones each reed vibrates at its natural pitch or frequency, and often conducting cavities are associated with each reed to modify the tone, that is, to change the pitch by an appreciable and audible amount.

It is, therefore, an object of the present invention to provide an improved method and means for sorting or testing musical reeds electronically, for constancy and value of pitch, and to provide for registering electronically, the degree and magnitude of departure from a predetermined standard pitch for any production reed, whereby it may be corrected or rejected prior to assembly in a completed instrument.

It is also an object of this invention to provide an improved method and means for effecting rapid duplication in manufacture, of a set of correctly pitched reeds, without having to blow or otherwise operate them in an instrument except in the final test operation of the completed instrument.

If a reed is mechanically vibrated or excited from a source of vibration of the order of or corresponding closely to its natural period of vibration or frequency, it will respond and vibrate at its natural period, and with increasing amplitude as the frequency of the source changes in the direction of exact resonance therewith. In recognition of this principle, the present invention has as its object and provides a highly practical solution of the problem of rapid and accurate sorting and testing of reeds for wind instruments and the like, so necessary in modern low cost manufacture.

It is a further object of this invention to provide an improved method and means for inspecting, sorting, and/or testing vibratory musical reeds, through modulation of an oscillator or a carrier wave by each of two vibrating standard reeds, one pitched above and the other pitched below a predetermined mean or desired pitch or frequency, electronic means being employed to register or indicate the departure of a driving reed, under test or observation, from the mean frequency, in magnitude and direction and between and with respect to frequency limits established by the two reeds above referred to, whereby effective and rapid correction may be made in the proper direction to attain proper tuning of the driving reed.

It is also a closely related object of the invention to provide a method and means of the character referred to, in which attainment of a predetermined desired mean frequency or pitch by a reed under test or observation, and its departure therefrom in magnitude and direction may be observed instantaneously and continuously throughout a testing operation.

In accordance with the invention, a reed to be tested is made part of an electronic system which it controls by the frequency and magnitude of its vibratory movement, and is compared electronically with at least one other vibratory reed in the system, which also exerts a controlling and limiting effect therein. Mass and stiffness of the reed under test may then be corrected, if necessary, to produce a predetermined or desired electronic effect in the circuit, indicative of correct response at a desired or predetermined mean frequency, deviations from which produce voltages and currents which vary in magnitude and polarity, and thereby effect a predetermined operation or indication as a measure of the compliance with or deviation from said mean frequency.

To provide flexibility in use in modern manufacturing plants, it is desirable that testing equipment of the type referred to be adapted for assembly in a unit and, accordingly, it is a further object of this invention to provide means for testing musical reeds for wind instruments and the like, which is readily adapted for unitary assembly in a single testing instrument or equipment, and at the same time, to be relatively simple in construction and operation.

It is also a further object of the invention, to provide an instrument of the type referred to, which may be sensitive to changes in frequency of a generating source, such as a vibrating musical reed, of the order of plus or minus two cents, that is, two one-hundredths of a semi-tone, such as the frequency difference between "A" and "A sharp," and which will also give indications of the sense and degree of the frequency difference from a desired standard, that is, whether higher or lower within limits of as much as plus or minus fifty cents, that is, fifty one-hundredths of a semi-tone.

The invention, however, will be better understood from the following description when considered in connection with the accompanying drawing, and its scope will be pointed out in the appended claims.

In the drawing, Figure 1 is a schematic circuit diagram of an electronic testing system for musical reeds, embodying the invention; and Figure 2 is a further schematic circuit diagram of a modification of the system in Figure 1, also embodying the invention.

Attention is now directed to the embodiment of the invention shown in Figure 1, in which a test reed indicated at 5, is mounted in suitable means 6 for effecting vibration thereof at its natural frequency in association with an electro-acoustical transducer 7, which converts sound from the reed as a source into corresponding electrical voltage or current variations which are amplified in a suitable amplifier 8 connected with the transducer.

The amplified sound frequency is applied to an electro-mechanical transducer indicated at 9, having a vibratory armature element 10 on which are mounted two reeds 12 and 14 for free vibration in unison or jointly, in a common plane (vertical plane as viewed in the drawing), and tuned sharp and flat, respectively, as indicated, the one above and the other below a normal desired or mean frequency of the reed 5 by predetermined equal small amounts such as 15 cents, that is fifteen one-hundredths of a semi-tone at the mean frequency.

In the present example, the test reed 5 is actuated and caused to vibrate by air currents induced to flow by a vacuum connection indicated at 16 through a cavity 17 in the casing of the device 6, over which cavity the reed is removably mounted in any suitable manner, as, for example, by clamping it in position at one end by a clamping screw 18 as shown. Sound from the reed is transmitted to the electro-acoustical transducer 7 through suitable conduit connection, indicated at 19, with the chamber 17. Any other suitable means for effecting vibration of the reed at its natural period may be provided, which also admits of efficient acoustical coupling between the reed and the transducer.

The transducer 7 may be provided by any suitable microphone, or the like, having a frequency response range which includes the operating frequencies of the reeds to be tested. The transducer 9 for converting the amplified electrical response to mechanical vibration may be of the type used for phonograph record cutting, such as a stylus or cutter holder providing a vibrating arm 10 as shown.

The tuned reeds 12 and 14, provide frequency standards for the system and are utilized as modulator means for two modulated oscillators indicated at 20 and 21. The reeds are metallic and are connected to ground through the vibrating arm 10. They may, therefore, be coupled to the system through two electrodes 22 and 23, suitably spaced from the free ends of the reeds, and connected to the oscillators 20 and 21, respectively, whereby the capacity variation between each vibrating reed and the electrode associated therewith produces modulation of the respective oscillator.

The modulation component is extracted from each of the oscillators and amplified through separate channels comprising high gain audio frequency amplifiers indicated at 24 and 25, connected respectively with the oscillators 20 and 21. The frequency of the modulation components are determined by the frequency of vibration of the reeds 12 and 14, and the magnitude varies with the intensity or magnitude of the vibrational action of the reeds. The corresponding direct current component of the modulation signal from each amplifier 24 and 25 is derived through suitable rectifiers, as indicated at 26 and 27, respectively, and applied to rectifier output circuits 28 and 29, respectively, across a load comprising two resistors 30 and 31, connected serially between the circuits 28 and 29 and grounded at the effective mid-point thereon as indicated.

The variable direct currents available at the terminals of the circuits 28 and 29 are utilized to operate a suitable indicator or meter device 35, preferably comprising two milliammeter elements 36 and 37, as illustrated, the element 36 being connected across the circuits 28 and 29 to produce a scale deflection of an indicating pointer 38 in response to the sum of the voltages in the two output circuits.

The milli-ammeter element 36 and its indicating pointer 38 thus provides an amplitude responsive indicator or meter element for indicating the amplitude of the total voltage across the circuits 28 and 29. The deflection of the pointer 38 is proportional to the total rectified current or voltage of both circuits 28 and 29.

The indicator element 37 is arranged to produce zero scale deflection of an indicating pointer 39 when the voltages in the circuits 28 and 29 are either balanced (equal), or zero. When the voltage from the circuit 28 predominates, the arrangement is such that the pointer 39 deflects to the right, and when the voltage from the circuit 29 predominates, the pointer 39 deflects to the left, as viewed in the drawing.

The milli-ammeter element 37 and its indicating pointer 39 provides a discriminator which operates in response to a differential voltage or current from the output circuits 28 and 29. The deflection of the pointer 39, therefore, is proportional to the voltage or current difference between the circuits 28 and 29 and is responsive to both the magnitude and the polarity of the differential voltage or current.

The operation is as follows: Assuming the system to be in operation with a test reed 5 in place and vibrating, the sound energy from the reed at its natural frequency will be applied to the electro-acoustical transducer 7, amplified by the amplifier 8, and will reappear as a corresponding vibration at the same frequency at the armature or vibrating element 10 of the electro-mechanical transducer 9.

The two standard reeds 12 and 14 carried by the vibrating arm 10 will vibrate with the same or differing amplitudes, depending upon whether the frequency of the reed 5, now applied to the reeds 12 and 14, falls mid-way between, or more closely approaches the exact tuned frequency of the one or the other. The amplitude of vibration of the two driven standard reeds 12 and 14, therefore, will vary with the driving frequency emanating from the reed 5, and it being apparent that equal amplitude results only when the frequency of the reed 5 under test lies midway between the natural resonance of the two reeds 12 and 14.

It will be seen that under the above condition, viz., equal amplitude of vibration of the standard reeds 12 and 14, the electrical output from the two circuits 28 and 29 will be equal and the center scale meter element 37—39 will remain in the zero indicating position shown. The amplitude meter element 36—38 at the same time, will provide an indication which is proportional to the sum of the electrical outputs of the circuits 28 and 29. This last indication is desirable for the reason that in some cases reed 5 may fail to start into vibration and would thus give the same zero indication at 39 as it would if it were vibrating at the exact mid or mean frequency between the frequencies of the standard reeds 12 and 14. Therefore, the meter element 36—38 indicates amplitude of response of the reed 5 and shows by its operation that the reed 5 is actually in vibratory operation, and that the indication of the meter element 39 may be relied upon.

If the normal frequency of the test reed 5 falls more closely to the frequency of the sharp reed 12, the amplitude of vibration of the latter will be greater than that of the reed 14. Accordingly, the output circuit 28 will receive the higher voltage and the meter element 39 will deflect to the right indicating a sharp reed at 5. Conversely, if the frequency of the reed 5 more closely approaches that of the reed 14, the reverse will be true, and the indicator 39 will deflect to the left, indicating a flat reed at 5.

Reed 5 may be rejected in either case, depending upon the limits which are set up for accuracy, but in any case, it will be seen that by use of the system shown, extremely fine discrimination is obtained with regard to any slight unbalance in the relative amplitude of the reeds 12 and 14 through the modulated oscillator channels A and B, and the micro-ammeter indicating means provided in connection therewith.

From the foregoing description, it will also be seen that the reed 5 may be rejected or accepted, or may be corrected and retested without delay, for the reason that in accordance with the invention, an accurate indication of its conformance with a predetermined standard or its departure therefrom in magnitude and direction is instantaneously and continuously derived for observation and proper action by an operative of the equipment.

In testing reeds having widely different frequency response, that is, reeds of widely different pitch, the standard reeds 12 and 14 are changed correspondingly to provide desired limits above and below the desired pitch or mean frequency to which the reed undergoing test is to be conformed.

In the routine testing of musical reeds for an instrument such as a harmonica, for which the present invention is particularly well adapted, means may be provided for conveniently switching into circuit any number of sets or pairs of standard reeds, such as reeds 12 and 14, pitched equally above and below a series of tones or musical scale frequencies corresponding to the number of tones or musical notes to be provided by the instrument.

In a harmonica, for example, nineteen different pitches or tones are provided by twenty reeds, two of the tones being duplicates, and the frequency range covers substantially three octaves, starting at 261.63 cycles (middle C) and extending to 2093.0 cycles (upper C), and the beginning of a fourth octave.

To cover this frequency range, or any similar range for other types of wind instruments, it has been found that at least eight sets of standard reeds are required, together with suitable means for multiplying the frequency of the test reed, thereby to utilize the same sets of standard reeds for certain harmonics of the lower scale frequencies in the range of frequencies to be covered.

Referring now to Figure 2, a modification of the system of Figure 1 is shown for covering an extended range of frequencies in testing reeds of different pitch as required for a complete musical instrument, such as a harmonica, for example.

A reed 50, representing any one of the series of reeds for a harmonica or other instrument, is arranged to be set into vibration for test by any suitable means, such as a sound chamber 51 provided with a vacuum connection 52 for drawing air past the reed while clamped in position by a thumb screw 53, substantially as shown and as hereinbefore described.

In the present example, the sound chamber is provided with an opening 54 communicating with the sound pick-up element 55 of a microphone 56, having a relatively broad frequency response characteristic over the desired frequency range, such as from 200 to 2,000 cycles in the present example.

The microphone operates as an electro-acoustical transducer and provides a variable voltage output corresponding in frequency to the frequency of vibration of the reed 50. This voltage is applied to the input grid 60 of a first stage amplifier tube 61, providing a high degree of amplification of the input voltage. This may be of the commercial 6SJ7 type. The output anode circuit 62 of the tube 61 is coupled through a capacitor 63 and a volume control potentiometer 64, with the input grid 65 of an inverter stage 66, which may be of the double triode type shown and provided by a commercial type 6SL7 tube. The second grid 67 of the tube is connected with an inverter network 68 which is coupled to the output anode circuit 69 through a capacitor 70.

The output anode circuit 69 is also coupled through the capacitor 70 with one input grid 71 of a frequency doubler or multiplier tube 72, the other input grid 73 of which is coupled through a capacitor 74 with the second anode output circuit 75 of the inverter stage. With this arrangement, as is well known, the single ended voltage input to the grid 65 is amplified by the inverter stage 66 and applied in push-pull relation to the input grids 71 and 73 of the frequency multiplier stage which may be provided by a commercial type 6SN7 tube.

The final output anodes of the frequency multiplier stage, in this case, the anodes 80 and 81, are connected with a common output circuit 83 across an output choke coil 84 in the positive supply lead 85. The second anode 81 is connected in parallel with the anode 80 to the circuit 83, through a suitable switch 86, which, when closed, provides for doubling the frequency of the output at 83 over the frequency of the input from the microphone 56 as applied at the grids 71 and 73. The stage 72 thus represents any number of multiplier stages. Additional stages may be provided as required, in the same manner, for additional multiplication.

The multiplier output circuit 83 is coupled through a lead 86 and a suitable capacitor 87 with a selector switch 88, from which the amplified signal frequency from the reed 50, suitably multiplied in certain cases, may be applied to various pairs or sets of standard reeds in the further test operation as will hereinafter be described.

In the present example, an eight position switch is indicated, providing for selective output of the amplified test reed frequency to eight different circuits 89, four of which are shown in connection with four electro-mechanical transducer devices 90–93, inclusive. These devices may be of the piezo-electric type having a relatively high degree of sensitivity and power, as used for example, for phonograph record cutting and the like.

The metal stylus or vibratory elements 95 of the devices 90–93 are connected to ground as indicated, and provided at their outer ends with insulating blocks 96 on which are mounted a plurality of selected standard reed elements 97 to 104, inclusive, in close spaced parallel relation to each other in pairs as indicated.

Between each pair of reeds is provided a grounded electrode 105 with respect to which in variable capacity relation the free ends of the reeds may move when vibrated by their respective transducer devices 90–93. It will be noted that each pair of reeds is driven by a separate driver and that in each pair, one of the reeds is tuned flat and the other sharp, in equal degrees, with respect to a predetermined mean frequency. In the present example, reeds 97, 99, 101 and 103 may be assumed to be tuned sharp, while reeds 98, 100, 102 and 104 are tuned flat, with respect to a predetermined series of mean frequencies.

For the sake of simplifying the drawing, the remaining drivers and reeds normally connected with the leads 89 are not shown as they are connected in the same manner and for the same purpose in the series.

As the selector switch 89 is closed to any one of its predetermined positions, such as that shown for the driver element 93, only that element will be actuated in response to vibration of the test reed 50, and accordingly, with the driver 93 energized, reeds 103 and 104 only will be in action.

It has been found that all of the sharp reeds and, likewise, all of the flat reeds may be connected in parallel to provide a single pair of control circuits for the modulation of two oscillators 110 and 111, from which are derived the discriminatory pitch or frequency indications hereinafter described, after the manner of the preceding embodiment.

In the present example, the sharp reeds 97, 99, 101 and 103 are connected in parallel to a frequency control or modulator circuit 112 for the oscillator 110, and the flat reeds 98, 100, 102 and 104 are connected in parallel with a frequency control or modulator circuit 113 for the oscillator 111. Modulation control for the oscillators 110 and 111 may then be provided by the effective variable capacity to ground for the leads 112 and 113, through the vibration reed elements 97–104, inclusive, in any suitable circuit arrangement.

In the present example, each oscillator is provided with a control grid 115, a grounded cathode 116 and an output anode 117, and may be of the commercial 6J5 type. Each grid is connected through a suitable grid leak 118 provided with a shunt grid capacitor 119, and through a tuning inductance 120 to the cathode 116. Feedback for sustaining oscillations is provided through a coupling capacitor 121 between the output anode and the grid.

In addition, controlled feed-back in each oscillator is provided through a feed-back coil 122, connected at one end with the anode circuit through a coupling capacitor 123, and is inductively coupled with the tuning inductance 120, as indicated. This arrangement serves to vary the feed-back and thus modulate the oscillator when the flow of feed-back current through the coil from the anode is varied.

The above variation in feed-back modulation is obtained for each oscillator circuit by connecting the opposite ends 127 and 128 of the feed-back coils to ground through a suitable variable capacitor means. In the present example, the terminal 127 of the feed-back coil for the oscillator 110 is connected with the control lead 112, while the terminal 128 of the feed-back coil for the oscillator 111 is connected with the control lead 113.

With this arrangement, it will be seen that variation in capacity to ground in the circuit 112 by vibration of any of the sharp reeds will cause variation in feed-back and modulation of the oscillator 110, while vibration of the flat reeds will likewise vary the feed-back in oscillator 111, both with respect to a steady state or condition of oscillation set up by the fixed feed-back through the capacitors 121.

The above described variation in feed-back results in a variation in the oscillator grid voltages at the frequencies of vibration of the standard reeds then connected with the oscillators, and these voltages appearing across the grid resistors 118 are amplified and appear in the anode circuits of the oscillators. The frequency of operation of the oscillators is determined by the inductance of the grid coils 120 and the effective tuning capacity in shunt therewith. To provide for tuning each oscillator to operate at a predetermined frequency, shunt variable tuning capacitors 125 and 126 may be connected with the inductances or coils 120, as shown.

The oscillator circuits per se form no part of the present invention and, accordingly, any suitable modulated oscillator circuit may be provided in connection with the variable capacity control leads 112 and 113 to produce resultant audio frequency or modulation output voltages at the respective oscillator output circuits.

In the case of the oscillator 110, the amplified voltage appearing in an output circuit 130 is further amplified in a suitable two stage amplifier, comprising amplifier tubes 131 and 132, having a final anode output circuit 133 and an output impedance 134 across which the amplified oscillator modulation component appears as a voltage varying in frequency in accordance with the frequency of the standard modulating reed then connected with the oscillator 110. The amplifier tubes may be of any suitable type such as triodes commercially designated as 6C5 type.

In a similar manner, an output circuit 135 for the oscillator 111 is coupled through two amplifier stages 136 and 137 to an output circuit 138 in which is provided an output impedance comprising two series connected elements 139 and 140.

A portion of the amplified output voltage from the oscillator 110 appearing across the impedance 134 is selected by a potentiometer connection 141 thereon, and applied through a coupling capacitor 142 to one terminal 143 of a center tapped load impedance 144 for a pair of rectifiers 145 and 146 connected back to back therewith as indicated. These may be provided in a single envelope by a commercial type 6H6 tube, or the like, as shown.

A tap 150 between the output impedance elements 139 and 140 is coupled to the opposite terminal 151 of the rectifier load impedance 144 through a coupling capacitor 152, whereby a portion of the amplified output voltage from the oscillator 111 is also applied to the rectifier circuit. It will be noted that the center tap 153 of the load impedance 144 is connected to ground.

A zero center scale milli-ammeter or indicator device 155 is connected to the terminal 153 through ground, and to the terminals 151 and 143 through the rectifiers 145 and 146, respectively. A second milli-ammeter or indicator device 156 is connected directly across the load resistor 144 between the terminals 143 and 151 through a current limiting impedance 157.

With this arrangement, the indicator 156 responds to the combined rectified voltage output from the two oscillators 110 and 111, that is, from the combined sharp and flat channels through the respective amplifiers, while the indicator 155 responds to the differential voltage from the two channels. The reading of the meter 155 is initially set on zero preparatory for operation in testing, by adjusting the potentiometer connection 141 so that the voltages at terminals 143 and 151 are equal as will hereinafter appear.

The modification of the invention shown and described in connection with Figure 2 is particularly adapted for the routine testing of a plurality of reeds having different tones for a full musical instrument, such as a harmonica, and the operation thereof will be described with reference to the following table of sound frequencies encountered in the production of musical reeds for a harmonica.

| Blow reeds | | | Draw reeds | | |
|---|---|---|---|---|---|
| Scale Pitch | Mean Freq. | Test Reading | Scale Pitch | Mean Freq. | Test Reading |
| C4 | 261.63 | 262.51+ | D4 | 293.66 | 293.1− |
| E4 | 329.63 | 330.52+ | G4 | ¹392.0 | 393.8+ |
| G4 | ¹392.0 | 391.71− | B4 | 493.88 | 494.6+ |
| C5 | 523.25 | 522.1− | D5 | 587.33 | 586.8− |
| E5 | 659.26 | 659.0− | F5 | 698.46 | 696.9− |
| G5 | 783.99 | 783.8− | A5 | 880.0 | 879.1− |
| C6 | 1,046.50 | 1,045.15− | B5 | 987.77 | 987.8+ |
| E6 | 1,318.51 | 1,318.0− | D6 | 1,174.66 | 1,173.8− |
| G6 | 1,567.98 | 1,564.0− | F6 | 1,396.91 | 1,394.1− |
| C7 | 2,093.0 | | A6 | 1,760.0 | 1,760 |

¹ Same pitch duplicated.

Referring again to Figure 2, the test reed 50 represents any one of a series of reeds which may be responsive to any of the frequencies above listed under the column "mean frequency." As certain reeds may have a higher sound output than others, the gain of the microphone amplifier may be adjusted by the control element indicated at 64, so that the vibratory action of the selected transducer at 90–93, for example, and others not shown, may be limited to a desired maximum.

Likewise, the multiplier stage 72 connected with the microphone may, in some instances, be arranged to provide a higher multiplication, so that with a minimum of eight piezo-electric transducers, the full frequency range of reeds to be tested under the above table may be accommodated.

For example, it will be seen that if C6, E6, G6, C7, B5, D6, F6, and A6 are chosen for the mean frequencies for the eight pairs of flat and sharp reeds, as at 97–104, inclusive, in the present example, the frequency of a test reed at 50 for any of the lower frequency tones may be suitably multiplied to cause vibration of any pair of reeds above and below the desired mean frequency whereby the oscillators 110 and 111 are modulated in relative to multiples of the test reed frequency indicative of the compliance or departure of the test reed from its prescribed frequency. In the above table, in the columns marked "Test Readings," a typical set of values is indicated for reeds as manufactured for compliance with the given mean frequencies, and indicates the high degree of accuracy with which the frequency of each test reed may be determined by proper calibration of the standard reeds and the indicating meters.

It should be noted that the oscillator channels are adjusted initially for equal output by inserting a known standard reed at 50 in connection with a pair of standard modulator reeds, corresponding to the mean frequency of the standard test reed at 50, and then adjusting or balancing the output of the sharp channel against the output of the flat channel by means of the potentiometer device 141—134 in the output circuit of the amplifier 132, so that the discriminator meter 155 reads on "zero" at that time.

From the foregoing description, it will be seen that a musical reed testing system in accordance with the invention provides for effecting rapid duplication in manufacture of a series of correctly pitched reeds, each having a desired tone for use in a musical instrument, such as a harmonica, without requiring the preliminary asesmbly and operation in an instrument, whereby the final testing operation of the completed instrument is the only operating test required. With this system, therefore, the rate of production is increased while the quality of the product is maintained and costly rejections of completed work are obviated.

While the invention has been shown and described in its present preferred embodiments, it should be understood that it is not limited thereto, but may be carried out by other means within the limits and scope of the appended claims.

What is claimed as new and useful is:

1. In a musical reed testing system, the combination of a sharp reed pitched above a predetermined tone frequency, a flat reed pitched equally below said tone frequency, an oscillator having a modulation control circuit coupled to said sharp reed, means responsive to vibration of the sharp reed for modulating said oscillator, a second oscillator having a modulation control circuit coupled to said flat reed, means responsive to vibration of the flat reed for modulating said second oscillator, means for vibrating said reeds in unison in response to vibration of a test reed, means for rectifying the modulation component of the output from each oscillator to produce two variable D.-C. potentials, and means for comparing said potentials to obtain an indication of the differential thereof as a measure of the differential between the pitch of the test reed and said predetermined tone frequency.

2. In a musical reed testing system, the combination of a plurality of standard reeds tuned in pairs for response equally above and below each of a series of musical tones, means selectively responsive to the vibration of a test reed for exciting a predetermined pair of said standard reeds into vibration jointly at a multiple of the frequency of vibration of the test reed, electronic means including electronic modulating means responsive to vibration of the standard reeds in pairs for producing a D.-C. potential which varies in magnitude and polarity with variation in relative amplitude of vibration of the reeds in any pair when so excited, and means responsive to said variable potential for indicating the frequency response of the test reed relative to one of said musical tones.

3. The method of indicating the operating frequency of a test reed, which comprises vibrating the reed at its natural frequency, imparting vibrations therefrom to two standard reeds tuned for response equally above and below a predetermined harmonic of a desired frequency for the test reed, electronically comparing the vibration amplitude of said standard reeds to derive a differential D.-C. voltage variation therefrom, and deriving from said voltage variation and indication of the direction and magnitude of the frequency difference between the test reed frequency and said desired frequency therefor.

4. In a musical reed testing system, an electro-acoustical transducer for receiving acoustical vibrations from a test reed, electronic means for amplifying the translated vibrations therefrom, a pair of standard frequency reeds responsive to different frequencies above and below a predetermined mean frequency, electro-mechanical transducer means for applying the amplified vibrations to said standard reeds to excite vibration therein, a pair of modulated oscillators, means responsive to the vibration of said standard reeds for modulating each of said oscillators, one from each of said reeds, and electronic means for indicating the relative modulation output of said oscillators as an indication of the difference between the mean frequency and the frequency of vibration of said test reed.

5. A musical reed testing system comprising in combination, an electro-acoustical transducer for receiving acoustical vibrations from a test reed, variable gain electronic means for amplifying and multiplying the translated vibrations therefrom, a plurality of standard frequency reeds responsive to different frequencies pitched above and below each of a series of predetermined mean frequencies in pairs, electro-mechanical transducer means for applying the amplified vibrations to said standard reeds in pairs to excite vibration therein, a pair of modulated oscillators, means responsive to the vibration of said standard reeds for modulating said oscillators, one oscillator being modulated by the higher pitched reeds of each pair, and the other by the lower pitched reeds of each pair, electronic means for indicating the relative modulation output of said oscillators as an indication of the difference between a selected mean frequency and a harmonic frequency of vibration of a test reed, and means for selectively connecting each of said electro-mechanical transducer means with said first named amplifying and multiplying means.

6. A testing system for vibratory musical reeds and the like, comprising in combination, an electro-acoustical transducer, means for imparting sound energy thereto from a test reed in vibration, electronic means for amplifying the translated vibrations from said transducer, two tuned standard reeds, one of which is tuned slightly higher than a desired mean tone frequency and the other of which is tuned slightly lower than said mean tone frequency, an electro-mechanical transducer connected with said amplifying means to receive the amplified vibratory electrical output therefrom and having a vibratory armature element on which said two standard reeds are mounted for vibration each at one free end in unison in response to operation of said element, two modulated oscillators, means capacitively coupling said free ends of the reeds, one with each of said oscillators, to provide capacity variation and corresponding modulation of said oscillators by vibration of said reeds, means for amplifying the modulation output of each of said oscillators, a rectifier device connected with the output of each of said last named amplifiers to derive variable D.-C. potentials from the amplified modulation output of the oscillators, and a current responsive indicating device connected with said rectifiers for indicating a differential potential from said rectifiers in magnitude and polarity, thereby to indicate the direction and degree of departure from said mean tone frequency of the normal operating frequency of a test reed.

7. A testing system for vibratory musical reeds and the like, comprising in combination, an electro-acoustical transducer, means for imparting sound energy thereto from a test reed in vibration, variable gain electronic means for amplifying the translated vibrations from said transducer, two tuned standard reeds, one of which is tuned slightly higher than a desired mean tone frequency and the other of which is tuned slightly lower than said mean tone frequency, an electro-mechanical transducer connected with said amplifying means to receive the amplified vibratory electrical output therefrom and having a vibratory armature element on which said two standard reeds are mounted for vibration each at one free end in unison in response to operation of said element, two modulated oscillators, means capacitively coupling said free ends of the reeds, one with each of said oscillators, to provide capacity variation and corresponding modulation of said oscillators by vibration of said reeds, means for amplifying the modulation output of each of said oscillators, a rectifier device connected with the output of each of said last named amplifiers to derive variable D.-C. potentials from the amplified modulation output of the oscillators, a current responsive indicating device connected with said rectifiers for indicating a differential potential from said rectifiers in magnitude and polarity, thereby to indicate direction and degree of departure from said mean tone frequency of the normal operating frequency of a test reed, means for initially balancing the output from said modulation output amplifying means, and means for indicating the sum of the potentials from said rectifiers, thereby to indicate operation of a test reed.

8. A testing system for vibratory musical reeds and the like, comprising in combination, an electro-acoustical transducer device, means for imparting sound energy thereto from a test reed in vibration, means for amplifying resultant electrical current variations from the transducer, a plurality of electro-mechanical transducers corresponding in number to a desired number of different tones with any one of which a test reed is to be compared for frequency response, means for selectively connecting said amplifying means with each one of said transducers, each of said last named transducers having a vibratory armature element responsive to vibratory currents applied to said transducer, a pair of standard musical reeds mounted on each of said armature elements and having free ends which vibrate in unison therewith, one reed in each pair being pitched sharp and the other pitched flat in equal amounts with respect to a different mean frequency or tone of a musical scale, an oscillator having a modulation control circuit coupled to said sharp reeds, a second oscillator having a modulation control circuit coupled to said flat reeds, whereby said oscillators are modulated in response to vibrational operation of said reeds in pairs by each of said electro-mechanical transducers, means for amplifying and rectifying the modulation output from each of said oscillators to provide two variable D.-C. potentials which vary relatively in response to the relative amplitudes of vibration of the sharp and flat reeds of each pair, means for indicating the differential of said potentials in magnitude and polarity, and means for indicating the sum of said potentials in magnitude.

9. A testing system for vibratory musical reeds and the like, comprising in combination, an electro-acoustical transducer, means for imparting sound energy thereto from a test reed in vibration, electronic means for amplifying translated vibrations from said transducer, two tuned standard reeds, one of which is tuned slightly higher than a desired mean tone frequency and the other of which is tuned slightly lower than said desired mean tone frequency, an electro-mechanical transducer connected with said amplifying means for receiving the amplified output therefrom and having a vibratory armature element on which said two standard reeds are mounted for free vibration in unison in response to operation of said element, two modulated oscillators, two electrodes connected one to each oscillator and associated one with each of said standard reeds adjacent the free ends thereof and suitably spaced therefrom to provide capacity variation and corresponding modulation of said oscillators by vibration of said reeds, means for amplifying the modulation output of each of said oscillators, a rectifier device connected with the output of each of said last named amplifiers to derive variable D.-C. potentials from the amplified modulation component of the oscillator, a current responsive indicating device connected with said rectifiers for response to variations in magnitude and polarity of a differential of said D.-C. potentials, thereby to indicate the degree of departure from said mean frequency of the normal operating frequency of a test reed, and means responsive to the output potentials from said rectifiers in additive relation in the same polarity, and proportional to the sum of the amplitudes of the two standard reeds in vibratory response to operation of a test reed.

PAUL WEATHERS.
GEORGE E. CHAMBERLIN.

REFERENCES CITED

The following references are of record in the file of this patent:

UNITED STATES PATENTS

| Number | Name | Date |
| --- | --- | --- |
| 2,070,867 | Severy | Feb. 16, 1937 |